(12) United States Patent
Nishio et al.

(10) Patent No.: US 6,269,871 B1
(45) Date of Patent: Aug. 7, 2001

(54) HEAT EXCHANGER AND A METHOD OF PRODUCING THE SAME

(75) Inventors: Kiyoshi Nishio; Makoto Fujii; Yutaka Okamoto; Takuya Ishida, all of Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 09/076,863

(22) Filed: May 13, 1998

(51) Int. Cl.[7] .......................................................... F28F 9/16
(52) U.S. Cl. .......................... 165/173; 165/158; 165/178; 165/905
(58) Field of Search .................................. 165/173, 178, 165/158, 905

(56) References Cited

U.S. PATENT DOCUMENTS

| | | | |
|---|---|---|---|
| 2,056,920 | * 10/1936 | Demann | 165/178 X |
| 3,489,209 | * 1/1970 | Johnson | 165/905 X |
| 3,726,339 | * 4/1973 | Ash | 165/158 X |
| 4,735,261 | * 4/1988 | Huebner | 165/905 X |
| 4,790,372 | * 12/1988 | Gemeinhardt et al. | 165/173 |
| 4,867,233 | * 9/1989 | Gemeinhardt | 165/173 |

FOREIGN PATENT DOCUMENTS

| | | | |
|---|---|---|---|
| 1103944 | * 4/1961 | (DE) | 165/178 |
| 1235426 | * 5/1960 | (FR) | 165/70 |

* cited by examiner

Primary Examiner—Leonard Leo
(74) Attorney, Agent, or Firm—Jones, Tullar & Cooper, P.C.

(57) ABSTRACT

The present invention relates to a heat exchanger applied for an IC production line or the like, wherein, on plural independent tube holding holes 20 formed on holding plates 20, ends of resin tubes are arranged, and a predetermined length range α of the each resin tube is integrally fused into the each holding plate inside the tube holding holes. Each fusing portion for fusing the plural resin tubes into the holding plates has a non-contacted congestion structure wherein the resin tubes are not mutually contacted, thereby increasing reliability on connecting the fusing portion, and meanwhile, facilitating miniaturization of the heat exchanger by increasing heat-exchange efficiency and elements such as the resin tubes and the holding plates may be made of a fluororesin.

5 Claims, 8 Drawing Sheets

HEAT EXCHANGER AND A METHOD OF PRODUCING THE SAME

BACKGROUND OF THE INVENTION

1. Field of the Invention

The present invention relates to a heat exchanger employed for exchanging heat between two fluids, for example, one fluid, that is a strong acidic or a strong alkaline medical fluid employed in an Integrated Circuit production line (i.e., IC production line) inside a clean room, or various fluid such as a strong corrosive fluid, and another fluid, that is a heat transfer medium such as a cool medium or a heat medium. Moreover, the present invention relates to a method of producing the same.

2. Description of the Prior Art

Conventionally, the above noted heat exchanger having a structure, for example, shown in FIG. 8 is known. In this heat exchanger, a cylindrical shell 83 is fixed in a liquid sealing state, between fixing plates 81 and 82 made of polypropylene, arranged on either side, connectors 84 and 85 made of PTFE (polytetrafluoroethylene) or PFA (perfluoro-alkoxyfluoro Plastics), having a two step-cylindrical shape, in a liquid sealing state, and cylindrical sheath rings 86 fused into the right and left connectors 84 and 85 so that it may be positioned inside the shell 83. A number of fluororesin tubes 87, concretely made of PFA, are gathered for making a bundle, thus forming a tube bundle 88 as a heat transfer pipe. Both ends arranged longitudinally of the tube bundle 88 are fixed to the sheath rings 86 by fusing. Moreover, the connectors 85 and 84 have paths 89 and 90 for medical fluid. The shell 83 is provided with a cooling water inlet 91 and a cooling water outlet 92 for circulating the cooling water as an example of the heat transfer medium (or heat-exchanging-fluids such as a cool medium or a heat medium).

In the heat exchanger, a fluid to be heat-exchanged (or a fluid to be cooled or heated) is circulated inside each fluororesin tube 87 via paths 89 and 90 inside the connectors 84 and 85. Heat exchange is conducted between the fluid to be heat-exchanged and a cooling water circulating outside of the tube bundle 88 via the cooling water inlet 91 and the cooling water outlet 92 of the shell 83.

At both ends in the longitudinal direction of the tube bundle 88, respective resin tubes 87 are contacted with each other, thus being positioned in a honeycomb structure as shown in FIGS. 9 and 10. Gaps inevitably formed between the respective resin tubes 87 disposed in such a honeycomb structure, are closed by fusing the resin tubes 87 with each other. As a result, gaps formed inevitably between the resin tube 87 and sheath ring 86 are closed by fusing them. Therefore, in both ends in the longitudinal direction of the tube bundle 88, the respective resin tubes 87 included by the tube bundle 88, are contacted to be in a congested state (i.e. congestion structure) having no gap.

However, in case that both ends in the longitudinal direction of the tube bundle 88 have a congested structure having no gaps mentioned above, under the influence wherein the cooling water flows through an inside of the shell 83, the respective resin tubes 87 forming a tube bundle 88 swing, thus applying an excess load to each fusing portion of each resin tube 87 to decrease the strength of the fusing portion with the result that there is fear that the strength of the tubes is lacking.

Furthermore, the resin tubes 87 adjacent to each other are contacted with each other and the ends of the resin tubes 87 are integrally fused into each other, thus decreasing heat emission from the sheath ring 86 and the tube bundle 88 (i.e., tube binding portion) adjacent thereto. Accordingly, there is a problem of hindering a whole of the heat exchanger from being miniaturized in view of keeping heat-exchange efficiency.

Especially, in a clean room for producing an IC circuit or others, all machines and equipment used inside the room are required to be miniaturized. However, in the above conventional heat exchanger, it has been difficult to miniaturize it, whereby there has been a problem wherein a requirement of miniaturizing all machines and equipment are hardly satisfied.

SUMMARY OF THE INVENTION

It is an object of the present invention that fusing portions for fusing a number of resin tubes forming the tube bundle into a holding plate have a non-contacted congestion structure wherein each resin tube is arranged apart without directly contacting each other. Accordingly, even if the resin tube is swingingly moved under a flow of the heat transfer medium inside a heat exchanging chamber, an excess load is not applied to the fusing portions of the resin tubes, thereby enhancing reliability on connection of the fusing portions.

Another object of the present invention is to ensure a heat emission space between the resin tubes by the non-contacted congestion structure, thereby providing a heat exchanger having an excellent heat emission property and facilitating miniaturization thereof.

A further object of the present invention is to enhance the heat emission property in the ends of the resin tubes arranged on tube holding holes of the holding plates, thereby achieving further miniaturization of a whole of the heat exchanger.

Still another object of the present invention is that all elements of the heat exchanger, such as the holding plates and the resin tubes, are made of a fluororesin.

A still further object of the present invention is to employ radiant heat emitted from a heat source, so as to integrally fuse the holding plate into the ends of the resin tubes arranged on the tube holding holes of the holding plate.

In order to achieve the above objects, a heat exchanger having plural resin tubes for mutually exchanging heat between a fluid flowing inside the heat exchanger and a fluid flowing outside it. The heat exchanger has:

a holding plate having plural independent tube holding holes; and plural resin tubes having ends respectively arranged at the plural tube holding holes of the holding plate, the ends being integrally fused into the holding plate.

According to the present invention, heat-exchange is conducted between the fluid flowing inside the plural resin tubes and the fluid flowing outside it. As the fluid flowing inside the resin tube, for example, a fluid (or a fluid to be heat-exchanged) such as a medical fluid is cited, and as the fluid flowing outside the resin tubes, there is a heat transfer medium such as a cool medium or a heat medium.

In the present invention, the respective ends of the plural resin tubes are respectively arranged on plural independent tube holding holes formed on the holding plate, so as to be integrally fused therein. As a result, a fusing portion for fusing each resin tube into the holding plate are not contacted with the other fusing portions for fusing the other resin tubes therein. Therefore, each of the plural resin tubes has a non-contacted congestion structure wherein the holding plate is not contacted with the fusing portions. Consequently, even if a specific resin tube is slightly swung and moved under the flow of the heat transfer medium, there is no possibility wherein an excess load is not applied to each fusing portion of the other resin tube under the swinging flow of the resin tube. Therefore, reliability on connection of the fusing portions is enhanced.

Furthermore, because each resin tube has a non-congested structure at the fusing portions between the resin tubes and the holding plates, over the whole length of the each resin tube, a space therebetween for emitting heat is secured, thereby enhancing the heat emission property of the resin tube and achieving effectively miniaturization of a whole of the heat exchanger. Therefore, the heat exchanger suitable for one used inside the clean room is obtained.

In the heat exchanger, except the fusing portions between the ends of the resin tubes and the holding plates, each holding plate is preferably provided with a ring-space (or recess) positioned around a periphery of each resin tube, for emitting heat.

The heat exchanger according to the present invention having the above function and effect, is provided with a recess formed around the end of the each resin tube arranged on the tube holding holes of the holding plate, for emitting heat, whereby the heat transfer medium additionally enters into the recess, thereby enhancing the heat emission property (or heat-exchange effect) further so as to achieve the further miniaturization of a whole of the heat exchanger.

Preferably, a diameter of the tube holding holes arranged on the holding plate is almost equal to an external diameter of the each end of the each resin tube arranged on the tube holding holes.

The above condition ensures that each end of the resin tube arranged on each tube holding hole of the holding plate is integrally fused into the holding plate (that is, an inner surface of each tube holding hole), thereby improving reliability on connection.

Preferably, an outer end face of the holding plate and an end surface of each resin tube having each end arranged at each tube holding hole are on the same level.

Thus, even if the holding plate is provided with a recess located around the periphery of the each resin tube, for emitting heat, it is easy to ensure a large area of each fusing portion between each end of each resin tube and the holding plate.

This invention may have a configuration wherein the holding plates are disposed in pairs, opposite to each other, one end of the resin tube arranged at the tube holding hole of the holding plate on a side is integrally fused into the holding plate, and the other end of the resin tube arranged at each tube holding hole of the holding plate on the other side is integrally fused into the holding plate. In this case, a pair of fixation plates disposed oppositely and a cylindrical shell disposed between the fixation plates form a closed heat exchanging chamber, a pair of cylindrical connectors are separately fitted on the pair of fixation plates, one holding plate on a side and the other holding plate on the other side are separately fixed to the corresponding connectors by fusing, and an inlet and an outlet for pouring-in and pouring-out the heat transfer medium for communicating with the heat exchanging chamber, and an inlet and an outlet for making a fluid to be heat-exchanged flowing-in on one connector and flowing-out in the other connector are provided.

In such a heat exchanger, the heat-exchange is conducted between the heat transfer medium fed from the inlet to the heat exchanging chamber and the fluid to be heat-exchanged of the inside of the resin tubes, while the medium flows through the heat exchanging chamber. Thereafter, it flows out of the outlet. The fluid to be heat-exchanged is fed to the inside of each resin tube through the inlet of the fluid to be heat-exchanged disposed on one connector before it flows out of the outlet on the other connector.

All of the elements such as the holding plates, the resin tubes, the fixation plates and the shell may be made of the fluororesin, whereby the heat exchanger itself is excellent in chemicals-resistance and heat-resistant properties owing to the characteristics of the fluororesin.

A method of producing a heat exchanger according to the present invention comprises the steps:

arranging each end of the plural resin tubes at plural tube holding holes formed on the holding plate made of a resin, and fusing integrally the end into the holding plate, wherein radiant heat is employed in integrally fusing the holding plates into the ends of the resin tubes arranged at the tube holding holes of the holding plate.

In this producing method, a series of processes as below can be adopted. Each tube holding hole formed on the holding plate is divided into a small diameter portion positioned outside the holding plate and a large diameter portion positioned inside it. Each end of the resin tube arranged on the small diameter portion is integrally fused into only the small diameter portion by employing radiant heat, whereby the large diameter portion is provided with a ring-space for emitting heat located around a periphery of the resin tube, except a fusing portion into the small diameter portion.

In case of employing the producing method, it is possible to employ the holding plate, the resin tubes or the like made of the fluororesin. Moreover, preferably, radiant heat is applied to an outer surface of the holding plate from the heat source set at intervals.

A number of actions and effects about the heat exchanger and the method of producing the same are obviously shown by embodiments as below.

DETAILED DESCRIPTION OF THE PREFERRED EMBODIMENTS

Figure 1:
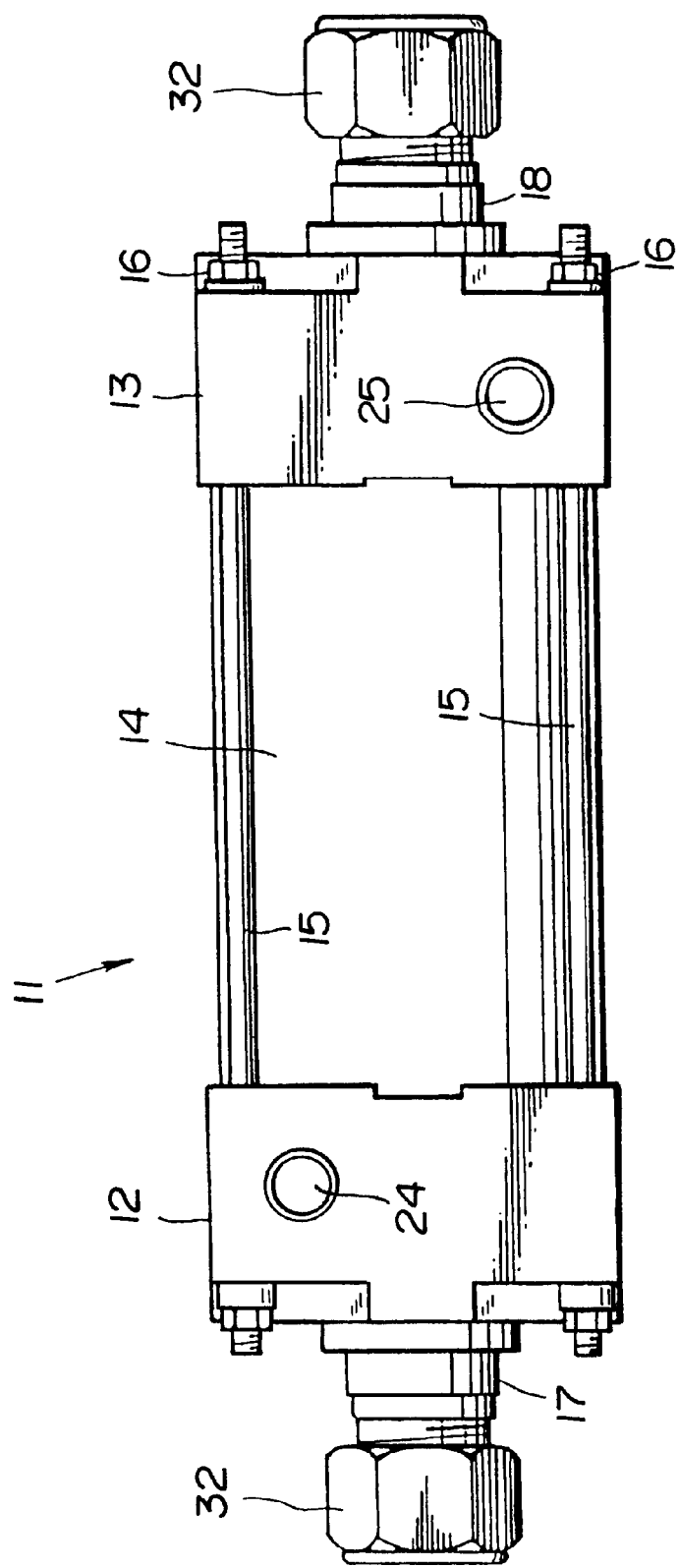
FIG. 1 is an outer view of a heat exchanger of the present invention.

Referring now to the drawing, preferred embodiments of the invention are described below.

Figure 2:
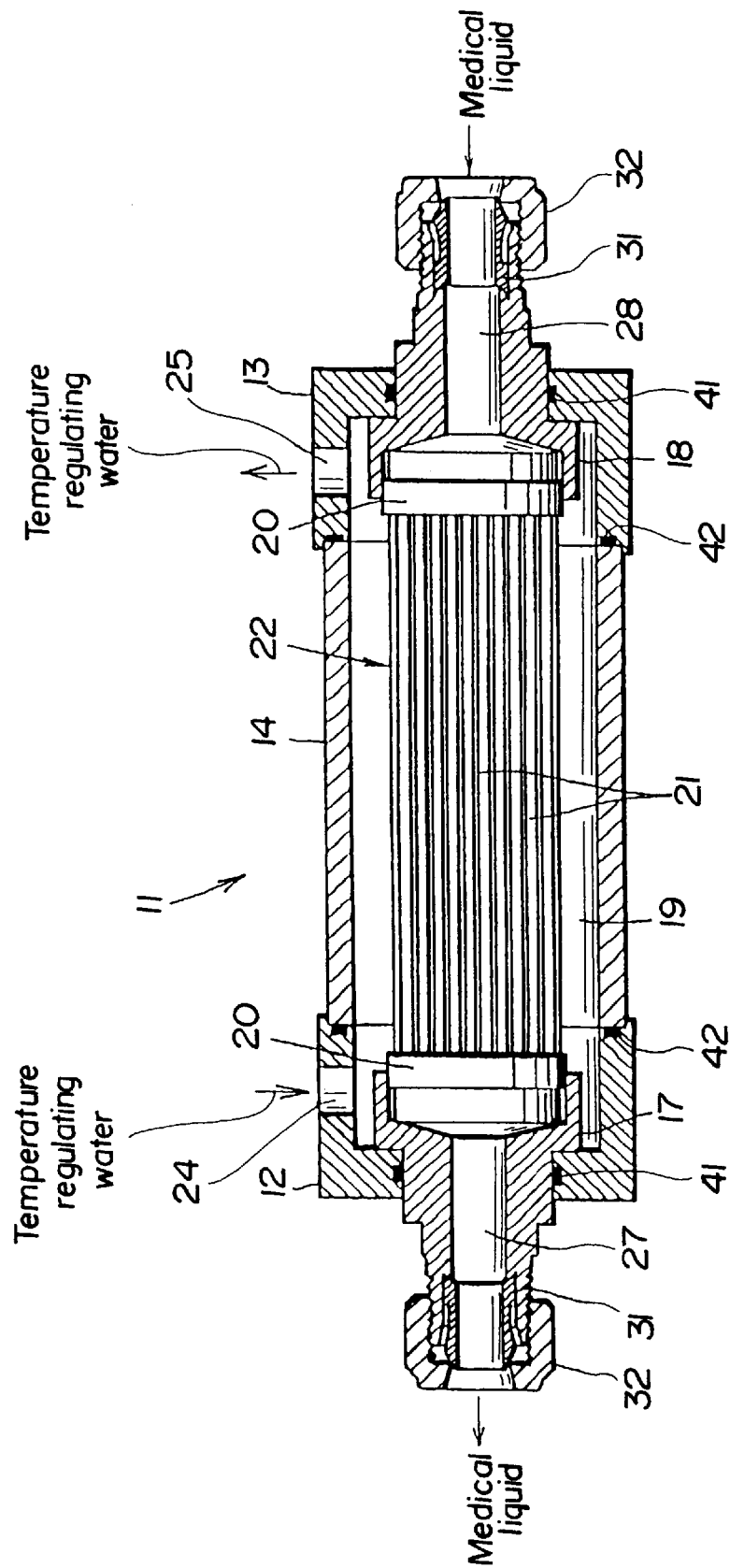
FIG. 2 is a sectional view of the heat exchanger according to FIG. 1.

FIGS. 1 and 2 show a heat exchanger employed in a closed clean room or the like. The heat exchanger 11 is provided with a heat exchanging chamber 19 including a pair of fixation plates 12, 13 disposed on opposite sides, and a cylindrical shell 14 disposed between the fixation plates 12 and 13. The cylindrical shell 14 is fixed to the fixation plates 12, 13 in a liquid-sealing state. The fixation plates 12, 13 on either side and the shell 14 are firmly joined by tie rods 15 and nuts 16.

The fixation plates 12 and 13 arranged on either side are fixed respectively to connectors 17 and 18 having a multiple-steps-cylindrical shape in configuration, in a liquid sealing state. In the connectors 17 and 18 on either side, a portion positioned inside the heat exchanging chamber 19 is connected with holding plates 20 as cores by fusing.

The heat exchanging chamber 19 is provided with a tube bundle 22 having a non-contacted congestion structure or a structure of gathered plural resin tubes 21 in a state wherein the plural resin tubes 21 as heat transfer tubes are not contacted with each other. The longitudinal ends of each resin tube 21 included in the tube bundle 22 are respectively fixed to the holding plates 20 on either side by a fixing structure as noted below. The longitudinally positioned ends of each resin tube 21 are fixed to the holding plates 20 on either side in the same structure.

Figure 3:
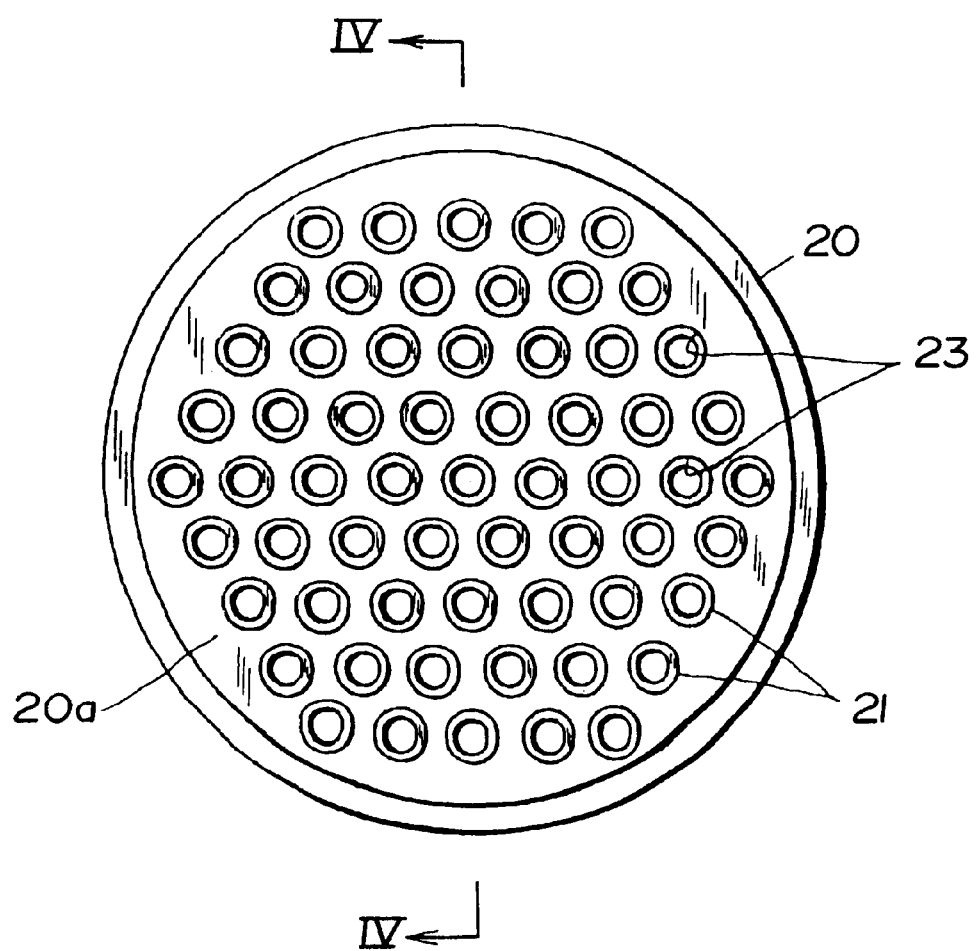
FIG. 3 is a front view illustrating fusing portions for fusing ends of the resin tubes into a holding plate.
Figure 4:
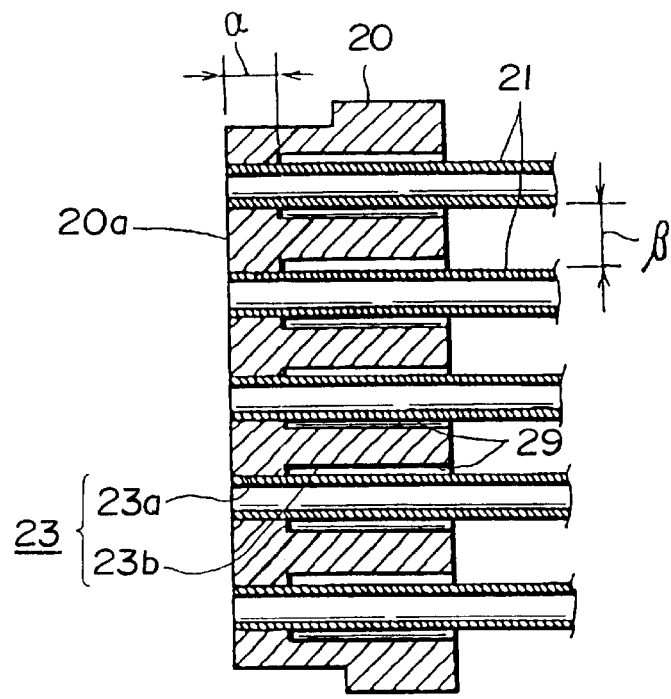
FIG. 4 is an enlarged sectional view of FIG. 3 cut along line IV—IV.

In other words, as shown in FIGS. 3 and 4, the disc-shaped holding plates 20 prior to being fixed to the resin tubes 21, are provided with a lattice arrangement of plural and independent tube holding holes 23 whose diameters are the same as the external diameter of the each resin tube 21. The ends of the plural resin tubes 21 are respectively inserted into the tube holding holes 23, thereby disposing each end of the resin tubes 21 on each tube holding hole 23 without any space. Moreover, end surfaces of the resin tubes 21 having the ends thereof disposed on each tube holding hole 23, and an outer end surface 20a of the holding plate 20 are flatly arranged. The end of the resin tube 21 arranged on each tube holding hole 23 is integrally fused into each holding plate 20 (i.e., inner side of the tube holding hole 23) by employing radiant heat emitted from a heat source 30 (cf. FIG. 5) as described below.

As shown in FIG. 4, in the present embodiment, each tube holding hole 23 of each holding plate 20 is divided into a small diameter portion 23a positioned on a side of an outer surface of the holding plate 20, and a large diameter portion 23b positioned on a side of an inner surface thereof. Of the ends of the resin tubes 21 arranged on the tube holding holes 23, the portion on the small diameter portion 23a is integrally fused into only the small diameter portion 23a by employing radiant heat, and on the other hand, the large diameter portion 23b is formed with ring-spaces 29 located around a periphery of each resin tube 21 for emitting heat. Accordingly, except for a fusing portion where each resin tube 21 is fused into the holding plate 20, each holding plate 20 includes the recess 29 located around the periphery of each resin tube 21, and opened on a side of the heat exchanging chamber 19, for emitting heat. In FIG. 4, a length α of the fusing portion is shown, and in the present embodiment, the length α corresponds to a length of the small diameter portion 23a.

Next, an inlet 24 of temperature regulating water as an example of a heat transfer medium is disposed on one fixation plate 12 of the fixation plates 12 and 13 on the either side, and an outlet 25 is formed on the other fixation plate 13. The inlet 24 and outlet 25 are respectively communicated with the heat exchanging chamber 19. After the temperature regulating water flowing into the inlet 24 flows through the heat exchanging chamber 19, it flows out of the outlet 25. Both connectors 17 and 18 include flow paths 27 and 28 for pouring a medical liquid as an example of the heat-exchanged fluid inside them, and the medical liquid flows through the path 28 inside the connector 18, the plural resin tubes 21 and the flow path 27 inside the connector 17 subsequently. Consequently, heat-exchange is performed between the medical liquid flowing through an inside of the plural resin tubes 21 in the heat exchanging chamber 19 and the temperature regulating water (or cooling water) flowing inside the heat exchanging chamber 19 outside the resin tubes 21. In FIG. 2, 31 and 32 respectively designate a sleeve and a union nut.

In the heat exchanger 11, preferably, the holding plate 20 is integrally fused into the end of the resin tube 21 arranged on the tube holding hole 23 of the holding plate 20, by employing radiant heat. Concretely, it may be performed by the method illustrated in FIG. 5.

Figure 5:
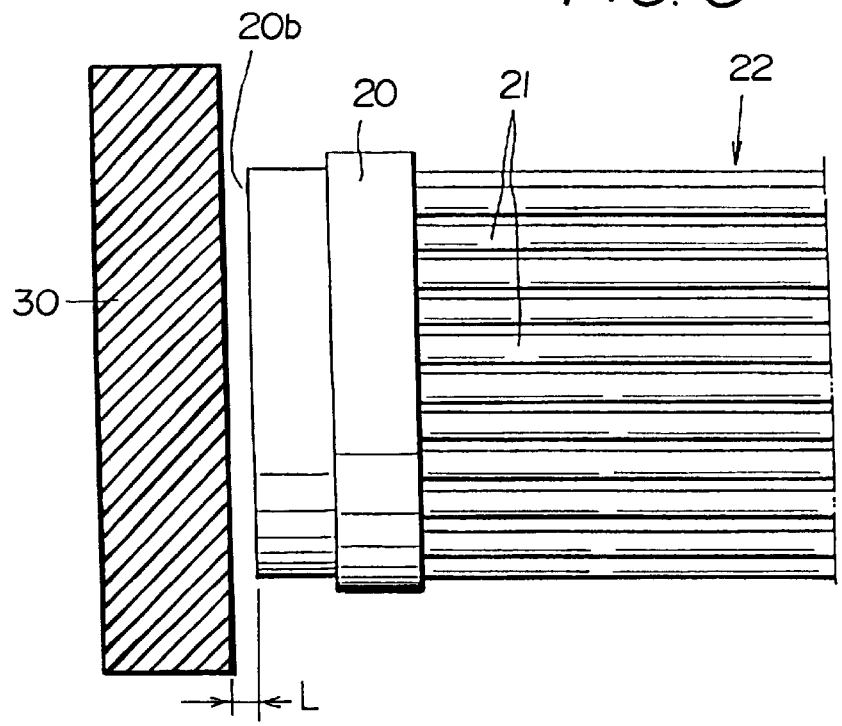
FIG. 5 is a diagram illustrating a method of producing the heat exchanger of the present invention.

In other words, the heat source 30 for applying radiant heat illustrated in FIG. 5 is set a distance L between the heat source 30 and the outer end surface of the holding plate 20. The distance is predetermined at 1 to 10 mm, preferably 1 to 5 mm, and a temperature of the heat source 30 is predetermined at 400 to 650° C., preferably 450 to 550° C., and after it is heated in 1 to 90 minutes, preferably 1 to 60 minutes, the heat source 30 is removed so that it is naturally cooled down, thereby fusing the holding plate 20 into the plural resin tubes 21 integrally.

In the heat exchanger 11 having the above structure, heat-exchange is performed between the fluid of the medical liquid or the like flowing through the inside of the plural resin tubes 21 and the temperature regulating water (i.e., the heat transfer medium) flowing through the heat exchanging chamber 19 outside of each resin tube 21. In this case, both ends of the plural resin tubes 21 are respectively arranged on the plural independent tube holding holes 23 formed on the holding plates 20 on either side, and a predetermined length range α in a longitudinal direction of each resin tube 21 from the end surface thereof is integrally fused into the holding plate 20, thereby forming a non-contacted congestion structure. Consequently, even if a specific resin tube 21 is slightly swung by the heat transfer medium such as the temperature regulating water, there is no possibility that an excess load (or stress) is applied to the fusing portions of the other resin tubes 21 owing to an influence thereof. Therefore, reliability on connecting the fusing portion is enhanced, thereby ensuring enough connecting strength. Additionally, a space β between the plural resin tubes 21 (see FIG. 4) is ensured, and the large diameter portion 23b of each tube holding hole 23 of the holding plate 20 forms the ring-space 29 located around the periphery of each resin tube 21 and opening on a side of the heat exchanging chamber 19, for emitting heat. Accordingly, thermal radiation efficiency of a whole of the heat exchanger 11 is remarkably enhanced, which contributes much to miniaturizing the whole of the heat exchanger 11. Therefore, it is most appropriate to the heat exchanger employed in a clean room.

Figure 7:
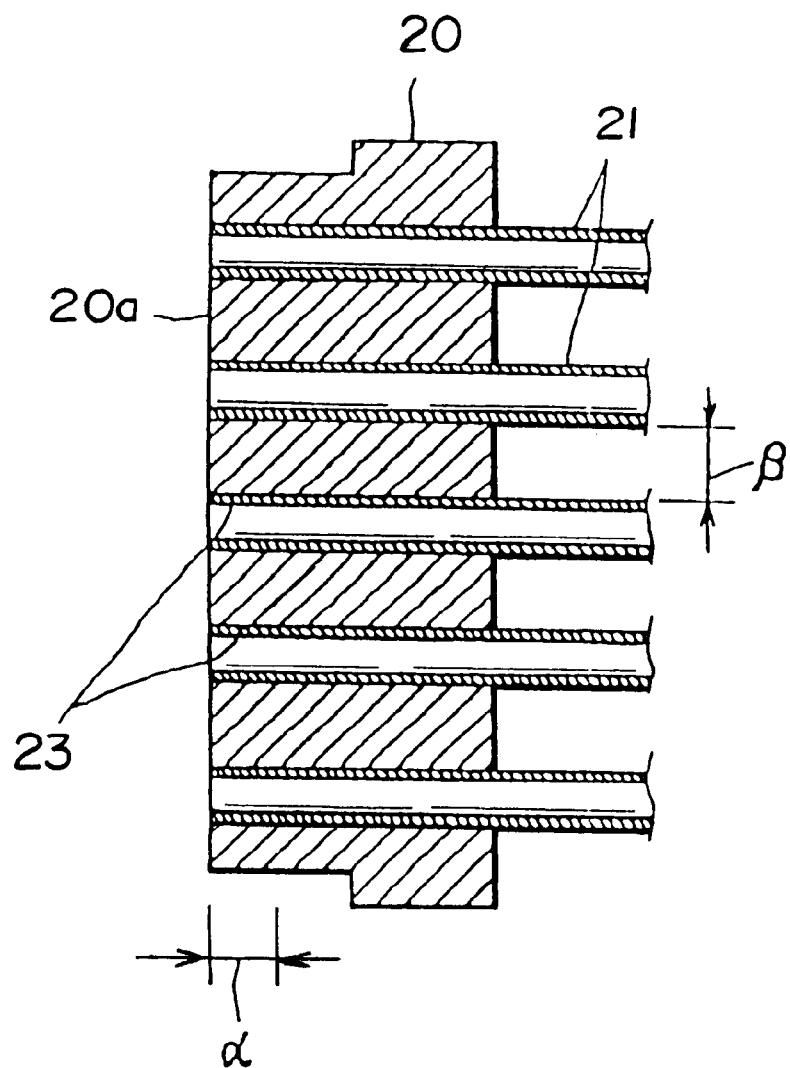
FIG. 7 is a partly enlarged sectional view of another embodiment of the heat exchanger according to the present invention.

FIG. 7 is a partially enlarged view of enlarging only main portions, illustrating another embodiment of the heat exchanger. Therein, each tube holding hole 23 penetrating the holding plate 20 as a core is disposed, a whole of the end of the resin tube 21 arranged by inserting in the tube holding hole 23 is subjected to a heating process by means of the above radiant heat, thus forming the each fusing portion having a predetermined length α. In constructing it in this way, there are effects wherein it is easy to apply a drilling process to holding plate 20 and the resin tube 21 is more firmly connected to the holding plate 20.

As to other points, this embodiment has almost the same functions and effects as the above previous embodiment, whereby elements in FIG. 7 identical to those in FIG. 4 are designated by the same reference numerals, and the detail description thereof is omitted.

In the above mentioned heat exchanger, needless to say, the resin tube 21 may be made of a resin, and the fixation plates 12, 13 and the shell 14 and connector 17, 18 and the holding plates 20, 20 may be made of a resin. Additionally, the tie rods 15 and the nuts 16 may be made of a resin. In case that each element is made of a resin, polypropylene polymers or a fluororesin may be suitably employed. As the fluororesin, concretely PFA (perfluoro-alkoxyfluoro plastics), PTFE (polytetrafluoroetylene), denatured-PTFE, FEP (fluorinated ethylene propylene resin), ETFE (etylene-tryfluoro-etylene), CTFE (chloro-tryfluoro-etylene), ECTFE (etylene-chloro-tryfluoro-etylene) may be preferably employed. Seal rings 41 and 42 or the like for keeping the sealing property of the connecting portion of each member shown in FIG. 2 may be also made of the fluororesin as mentioned above.

Figure 6:
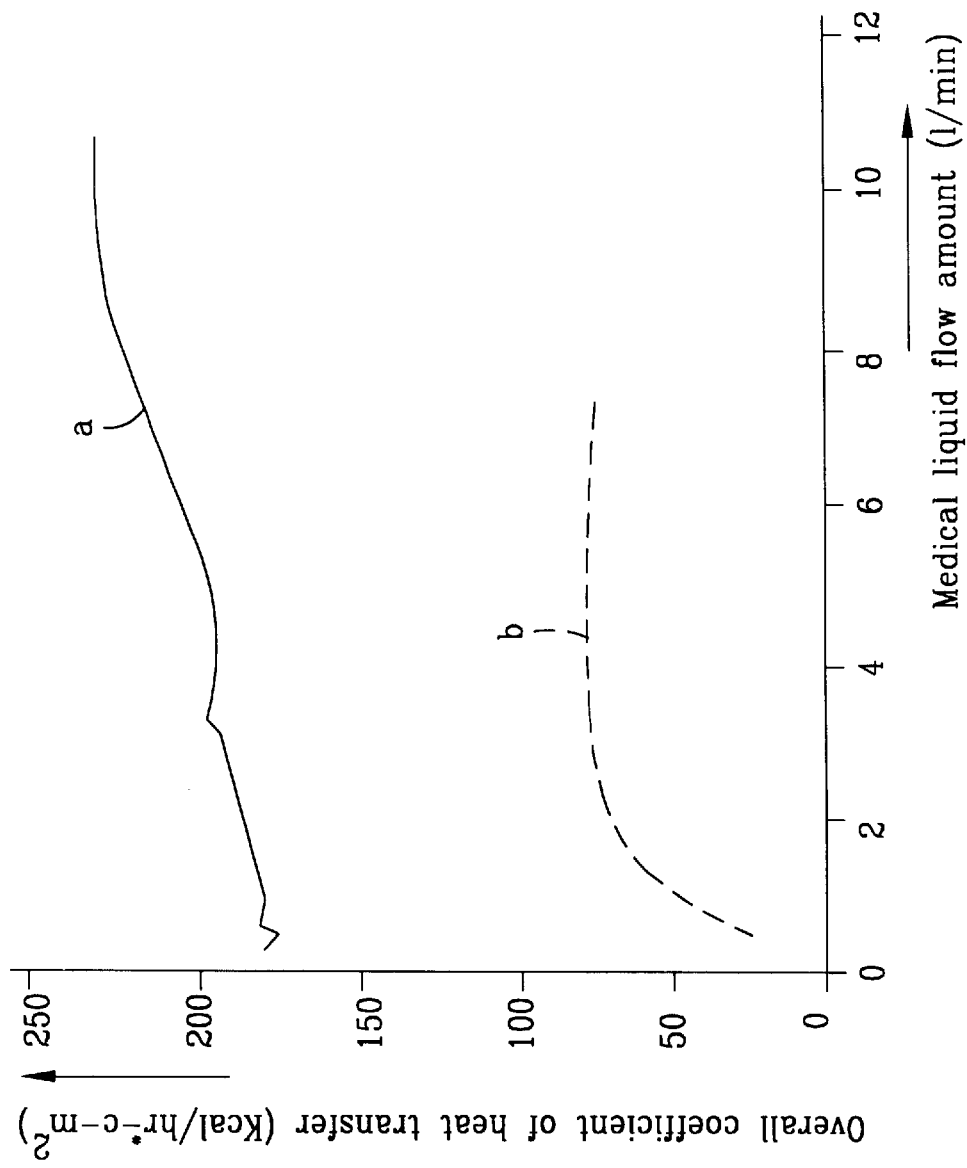
FIG. 6 is a characteristic view illustrating the change of an overall coefficient of heat transfer in relation to a medical liquid flow amount.
Figure 8:
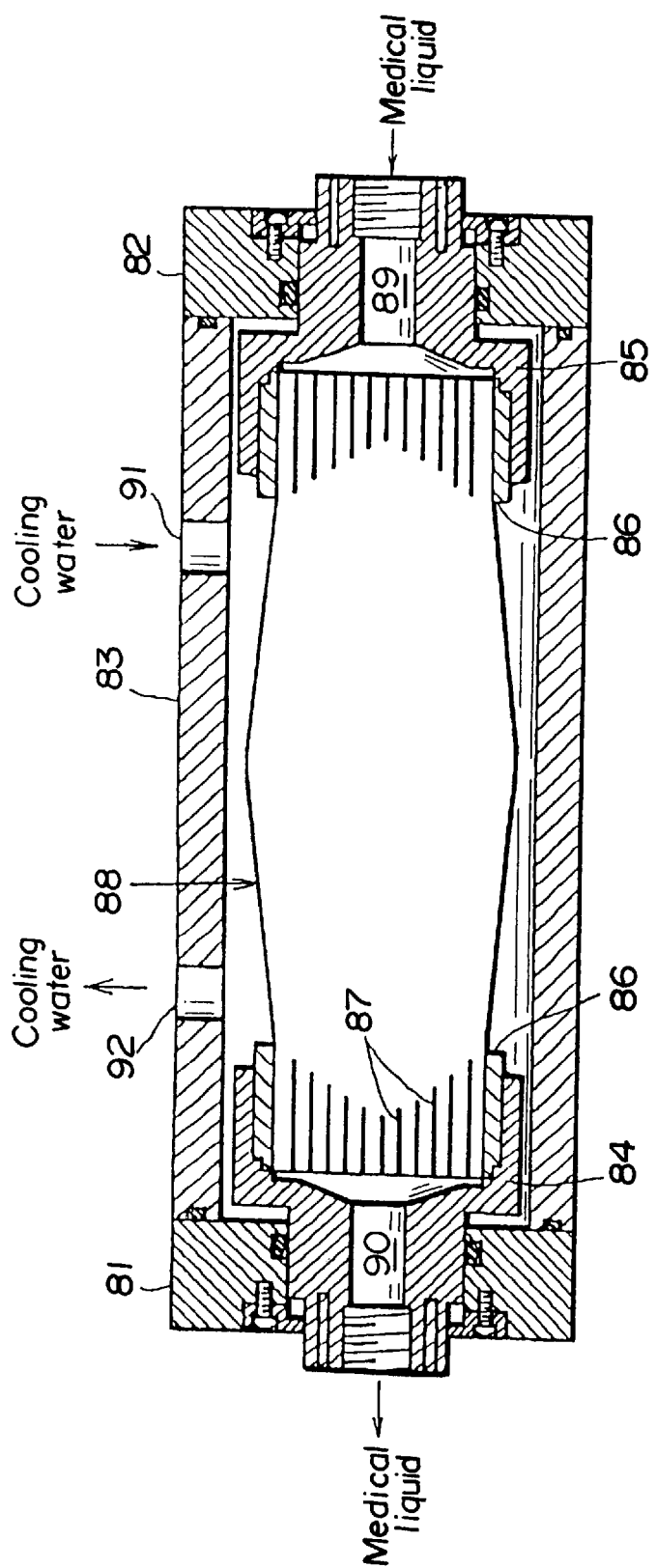
FIG. 8 is a sectional view of a conventional heat exchanger.
Figure 9:
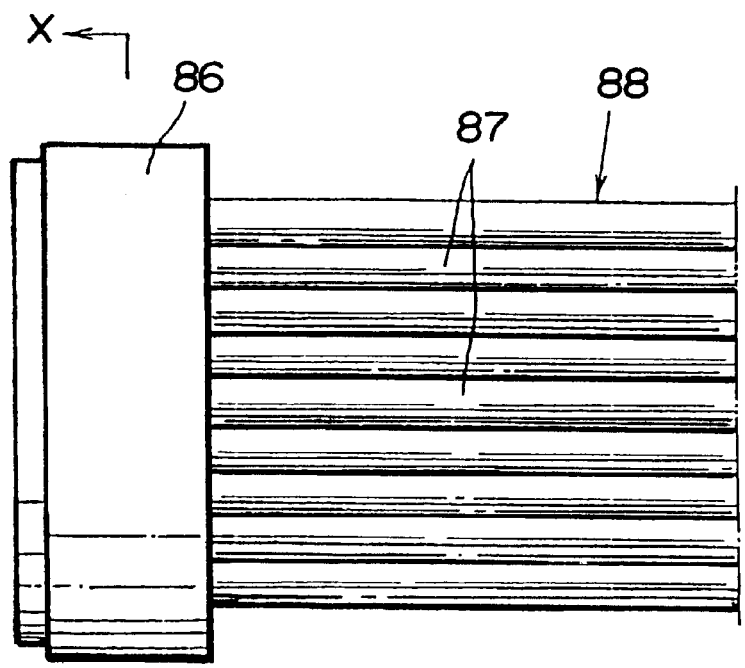
FIG. 9 is an enlarged view of enlarged main portions of the heat exchanger shown in FIG. 8.
Figure 10:
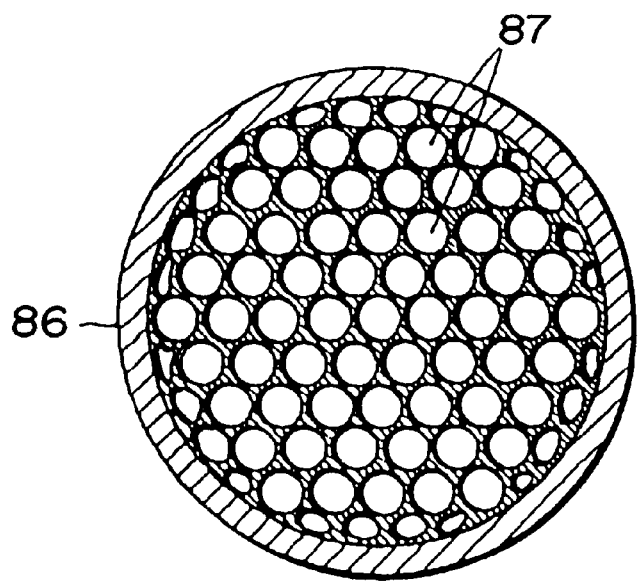
FIG. 10 is a sectional view of FIG. 9 cut along line X—X.

In order to compare the heat exchanger 11 in the embodiment illustrated in FIGS. 1 to 5, with conventional ones (see FIGS. 8 to 10) as the comparing embodiment, FIG. 6 shows a measuring result wherein an outer size and a tube size of each heat exchanger are identically predetermined, and a heat migration amount per unit area, a unit time, and a unit temperature of the surface of the tube is actually measured as an overall coefficient of heat transfer under the same condition. The number of tubes is 85 in the present embodiment, and 331 in the conventional one. In FIG. 6, a medical liquid flow amount is shown on the horizontal axis, and the overall coefficient of heat transfer is shown on the vertical axis with the result that a property "a" of the present embodiment is compared with a property "b" of the conventional one. An experiment result in FIG. 6 is obtained as to a heat exchanger having the fixation plates 12, 13 made of polypropylene polymers, and the connectors 17, 18, the holding plates 20, the resin tubes 21, the sleeves 31, the union nuts 32 made of PFA.

As obviously shown from the results of actual measurements in FIG. 6, the heat exchanger 11 of the present embodiment has achieved the overall coefficient of heat transfer which is twice or three times the conventional ones, comparing the present embodiment with the conventional one, thus enhancing heat-exchange efficiency, which leads to contributing to miniaturization of an entire heat exchanger 11.

What is claimed is:

1. A fluororesin heat exchanger employed in a clean room for an IC circuit producing line, comprising:

a plurality of resin tubes for mutually exchanging heat between a fluid flowing through an inside of the heat exchanger and a fluid flowing through an outside thereof; and a holding plate having plural independent tube holding holes, wherein: said plural resin tubes have ends respectively arranged at said plural independent tube holding holes of said holding plate, a longitudinally predetermined length of said resin tube from each end of said plural resin tubes being integrally fused into said holding plate; said holding plate has ring-spaces for emitting heat, respectively located around a periphery of each resin tube, except a fusing portion for fusing each end of said resin tubes into said holding plate; a diameter of each tube holding hole is almost the same as an external diameter of the end of each resin tube; and an outer end face of said holding plate and an end face of said resin tube having each end arranged at the tube holding hole at the same level.

2. The fluororesin heat exchanger according to claim 1, wherein said holding plates are disposed in pairs, opposite to each other, one end of the resin tube arranged at each tube holding hole of said holding plate on one side is integrally fused therein, and the other end of the resin tube arranged at each tube holding hole of said holding plate on the other side is integrally fused therein.

3. The fluororesin heat exchanger according to claim 2, further comprising:

a closed heat exchanging chamber formed by a pair of fixation plates disposed oppositely, and a cylindrical shell disposed between the pair of fixation plates, a pair of cylindrical connectors respectively fitted on the pair of fixation plates, the connectors being respectively fixed to one holding plate and the other holding plate by fusing, an inlet and an outlet of a heat transfer medium for communicating with the heat exchanging chamber, and an inlet and an outlet for a fluid to be heat-exchanged flowing-in in one connector and flowing-out in the other connector.

4. A heat exchanger according to claim 3, wherein the holding plate and the resin tube, the fixation plate and the shell are made of a fluororesin.

5. A heat exchanger according to claim 1, wherein the holding plate and the resin tube are made of a fluororesin.

* * * * *